F. W. MEYER.
DYNAMO ELECTRIC MACHINE.
APPLICATION FILED MAR. 24, 1915.
1,298,757.
Patented Apr. 1, 1919.
3 SHEETS—SHEET 1.
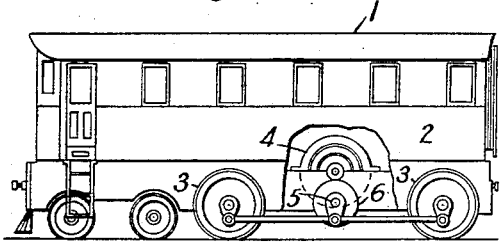
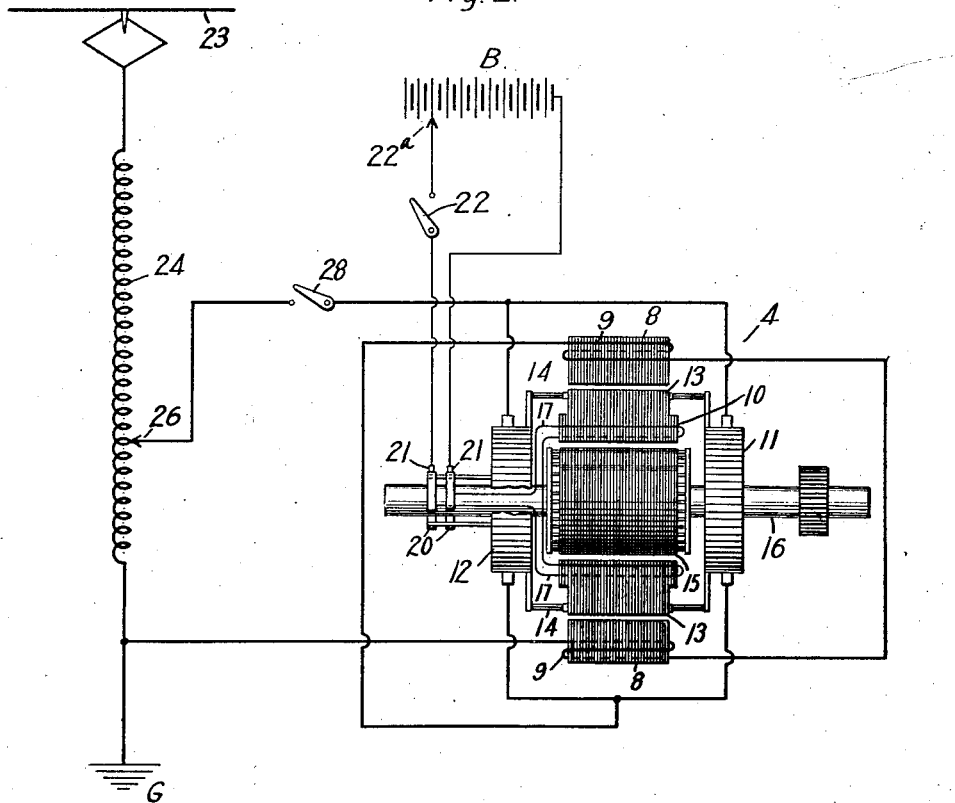
WITNESSES:
INVENTOR
Friedrich W. Meyer
BY
ATTORNEY.

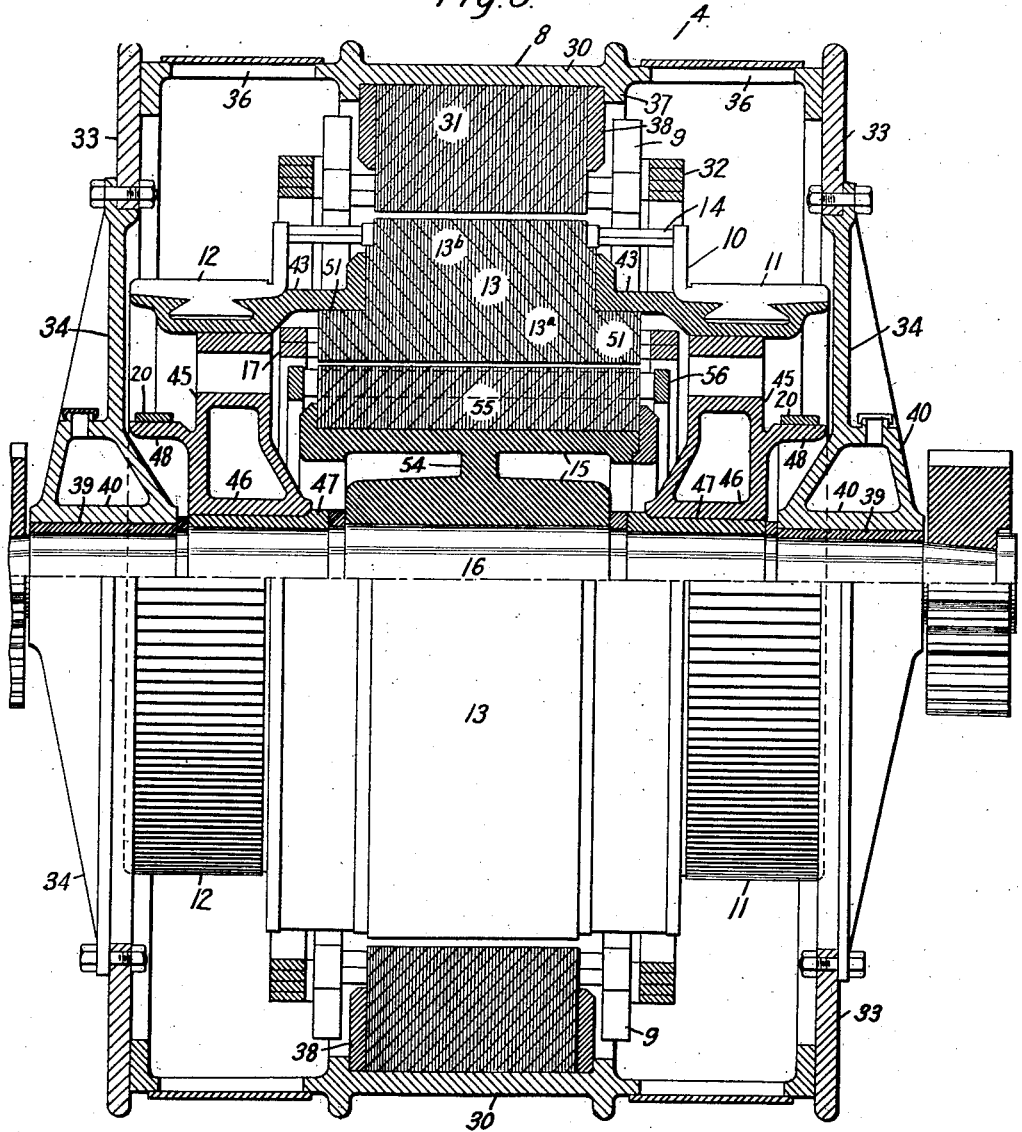

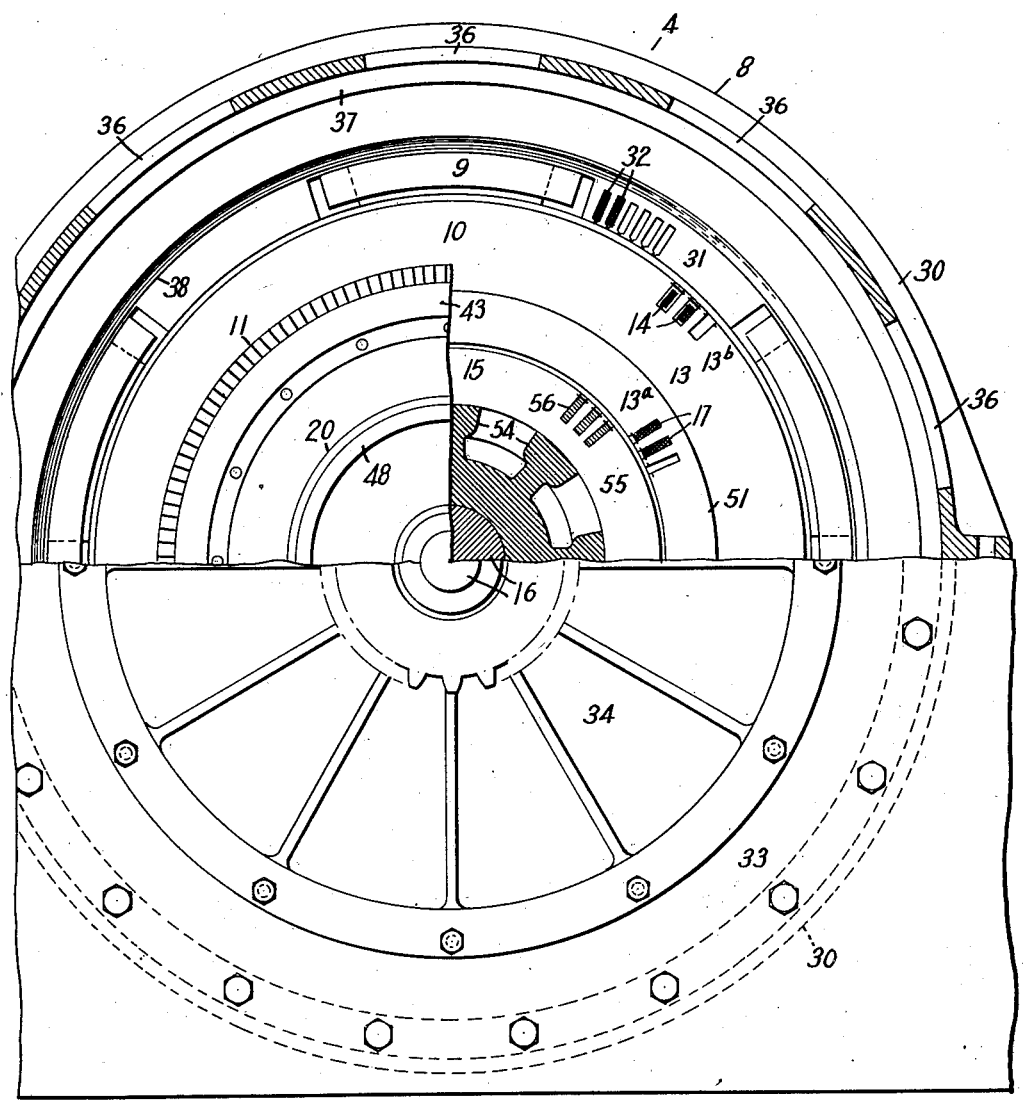

UNITED STATES PATENT OFFICE.

FRIEDRICH W. MEYER, OF PITTSBURGH, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,298,757.  Specification of Letters Patent.  Patented Apr. 1, 1919.

Application filed March 24, 1915. Serial No. 16,674.

*To all whom it may concern:*

Be it known that I, FRIEDRICH W. MEYER, a subject of the Emperor of Germany, and a resident of Pittsburgh, in the county of Allegheny and State of Pennsylvania, have invented a new and useful Improvement in Dynamo-Electric Machines, of which the following is a specification.

My invention relates to dynamo-electric machines and to methods and means for controlling the same, and it has special relation to the application of single-phase commutator motors for propelling electric locomotives.

One of the objects of my invention is to provide a dynamo-electric machine of the above-indicated character, as well as a means of control and a method of operating single-phase commutator motors, whereby good commutating conditions are maintained throughout the accelerating period.

It is another object of my invention to provide an electric locomotive propelled by single-phase commutator motors which shall be provided with adequate means for permitting relative movements or slip between the motor armatures and the driving shafts under heavy starting conditions, whereby the heating due to the short-circuit currents in the conductors under the brushes is distributed successively throughout all of the armature conductors.

Another object of my invention is to provide an electric locomotive that is equipped with driving motors of the single-phase commutator type which are adapted to propel the locomotive during accelerating periods and which are driven thereby during coasting periods. Moreover, I make provision for establishing yielding driving connections between the motor armatures and the shafts during motoring periods, and for permitting of the disconnection of said armatures and shafts when the locomotive is running down grade at high speed, whereby the armatures are not subjected to excessive mechanical strains by reason of the high peripheral speed attained.

More specifically stated, an object of my invention is to provide an electro-magnetic yielding clutch between the shaft and the armature of a single-phase commutator motor that is adapted to drive an electric locomotive. The clutch preferably comprises an auxiliary squirrel-cage rotor which is fixed to the driving shaft and is located inside of the usual motor armature, which may conveniently take the form of a double-commutator structure.

When single-phase commutator motors are utilized for propelling electric locomotives of very large capacity, such, for instance, as are employed for heavy freight service upon systems involving heavy grades, the size of the motor, when constructed in accordance with the customary design, becomes so great as to result in prohibitive peripheral speeds of the armature when coasting or running down grade at high speeds. For instance, a system, such as under consideration, might only require a maximum speed of approximately 25 miles per hour during accelerating or motoring periods, while a much higher speed such, for instance, as 45 miles per hour might be required during coasting periods. Such maximum speed requirements for powerful locomotives would be impossible with the ordinary design of single phase motor by reason of the centrifugal strains which would be imposed upon the armature by the high peripheral velocity.

Moreover, in freight service of the type under consideration, it is common practice, in starting a heavy train, for the rear locomotive to first take up slack between the several cars. During this period, which may last an appreciable length of time, the motors are unable to start, by reason of the load upon them, and abnormal short-circuit currents are produced in the armature conductors under the brushes, which, because these short-circuit currents are confined to a single coil in single-phase machines, would cause the short-circuited armature conductor to be severely damaged or burned out.

According to my present invention, the auxiliary rotor construction, which forms a part of a yielding electro-magnetic driving clutch between the armature and the shaft, permits the disconnection of the armature proper under such high-speed conditions as are attained during coasting periods, whereby the armature is relieved of abnormal mechanical strains. The auxiliary rotor, which preferably is of the squirrel-cage type, is of small diameter and rugged construction and will, therefore, be amply strong to withstand the strains imposed upon it.

Moreover, by reason of the yielding driving connection referred to, it is possible, in starting up heavy trains from standstill, to permit of a slight slip or relative movement between the armature and the driving shaft of the propelling motor, whereby heavy torques may be continuously applied for a short period, by reason of the fact that the abnormal short-circuit currents in the armature conductors under the brushes are distributed successively throughout all of the armature conductors until the load has been initially moved.

Furthermore, in order to improve the commutating characteristics of the single-phase motor during accelerating periods and particularly when the load is first taken on, the motor is started under no-load conditions by releasing the clutch, and, as soon as the motor begins to turn over, the load is thrown on, either gradually, in which case a certain amount of slip is permitted, or wholly, in which event the clutch is fully energized to lock the armature and the shaft positively together.

The results hereinbefore mentioned may be accomplished in a variety of ways and by means of various arrangements and location of parts, although I find it particularly convenient to employ a motor of the double-commutator type which lends itself readily to good electrical and mechanical design and which may be advantageously and economically manufactured and, moreover, produces a particularly compact and durable structure.

My invention may best be understood by reference to the accompanying drawings, in which Figure 1 is a side elevational view of an electric locomotive embodying a driving motor constructed in accordance with my invention; Fig. 2 is a semi-diagrammatic view of a system of control embodying my invention, and Figs. 3 and 4 are, respectively, a view, partially in side elevation and partially in section, and a view, partially in end elevation and partially in section, of an electric motor embodying my invention.

Referring to the drawings, and particularly to Figs. 1 and 2, a locomotive 1 comprises a cab 2, a plurality of driving wheels 3 and a driving motor 4 which is connected to the wheels 3 through a jack-shaft 5 and a suitable driving mechanism 6.

The driving motor 4 is of the single-phase commutator type and preferably of the double-commutator construction, as shown in Fig. 2, although not necessarily so. The motor 4 comprises a stationary field-magnet structure 8 having a field winding 9; a rotatable armature 10 embodying a plurality of commutator cylinders 11 and 12, a magnetizable core 13 and armature windings 14 that are associated with said core and connected to said commutator cylinders; and an auxiliary rotor 15 concentrically disposed within the armature 10. The rotor 15 may be of any suitable form but preferably constitutes a squirrel-cage member of well-known construction. The rotor 15 is secured to a shaft 16 upon which the armature 10 is rotatably mounted.

In order to transmit the driving effort of the usual working elements of the motor 4, namely, the field-magnet structure 8 and the armature 10, to the driving shaft 16, magnetizing windings 17 are provided upon the inner portion of the armature core 13 and, when energized, serve to electro-magnetically lock the armature 10 to the rotor 15, in accordance with well-known principles. The energization of the magnetizing windings 17 is effected through a pair of collector rings 20 which are conveniently supported from a part of the movable armature 10 and are connected to the respective terminals of the windings. The brushes 21 serve to supply energy to the windings 17 from a suitable auxiliary source, such as a battery B, through switch 22 and adjustable connection 22ª by means of which the energization of the magnetizing windings 17 may be varied as desired.

The driving motor 4 receives its working energy from a supply conductor 23, such as a trolley conductor of a railway system, which delivers single-phase alternating-current energy to an auto-transformer 24 which is connected between the conductor 23 and the ground G. An adjustable connection 26, which may take any convenient and well-known form, is provided for the purpose of varying the amount of voltage delivered by the transformer 24 to the motor 4. The circuit connection of the motor 4 from the adjustable connection 26 of the transformer 24 includes switch 28, parallel branch circuits which respectively include the commutator cylinders 11 and 12 and their associated armature conductors 14, and thence, in a single circuit, through the field-magnet windings 9 in series relation to the ground G.

Assuming the circuit connections and apparatus to be as indicated in Figs. 1 and 2, the mode of operation is as follows: In order to accelerate the locomotive 1, the switch 28 is first closed, thereby connecting the field-magnet windings 9 and armature conductors 14 of the driving motor 4 across a small portion of the transformer 24 in the manner already described. Under these conditions, the armature 10 is rotated in accordance with well-known principles as is effected in all single-phase commutator motors, although no load is imposed upon the motor by reason of the fact that the magnetizing winding 17 of the magnetic clutch is still deënergized. Therefore, the motor 4 is initially started light, and may be operated under relatively weak-field conditions and correspondingly good commutating conditions.

When the free armature 10 has just begun to turn over, switch 22 is closed to connect a portion of the battery B across the magnetizing windings 17, whereupon heavy currents are induced in the squirrel-cage rotor 15 which is caused to rotate substantially with the armature 10. If desired, a slight amount of slip may be provided for by suitably adjusting the energization of the magnetizing windings 17 through the agency of the adjustable connection 22$^a$ to the battery B, or any other suitable manner. Having thus established an operative driving connection between the armature 10 and shaft 16 through the electro-magnetic clutch, including the rotor 15 and the armature 10, the driving effort of the motor 4 is transmitted to the shaft 16 and thence through the jack-shaft 5 and driving mechanism 6 to the driving wheels 3. The locomotive 1 is thus started into operation.

In order to increase the speed of the locomotive, it is only necessary to adjust the connection 26 to the auto-transformer 24 to increase the voltage applied to the driving motor 4. In practice, this adjustment may properly be effected by means of unit switches which are so located as to provide several operating steps. When the motor voltage is increased by steps in the manner suggested, the motor is correspondingly accelerated. The electro-magnetic driving connection between the armature 10 and its shaft 16 provides sufficient flexibility to cushion any shocks, strains, or vibrations resulting from a sudden increase of voltage.

The locomotive speed, therefore, increases to a value corresponding to the new voltage and such increase may be effected smoothly as the slip between the rotor 15 and armature 10 may be gradually regulated by the proper adjustments of the magnetizing current. The motor voltage may be increased in successive steps, as desired, to increase the speed of the motor, and hence of the electric locomotive correspondingly, until full-speed operating conditions are attained.

For purposes of explanation, it may be assumed that the locomotive 1 passes over the crest of a grade and starts to coast down at a rapid rate of speed which considerably exceeds the normal motoring speed and would result in dangerous peripheral speeds of the armature 10 if the driving connections through the electro-magnetic clutch were maintained. Under the conditions set forth, therefore, the switch 22 is opened to effect the deënergization of the magnetizing windings 17 whereby the rotor 15 and its shaft 16 are disconnected from the armature 10.

Thus, the armature 10 is permitted to remain at rest, while only the relatively small rotor 15 is driven by the wheels 3 of the locomotive 1. This part of the machine is amply designed to withstand any strains imposed upon it by reason of the excessive speed.

Having described my invention in its broadest aspect in connection with its application to an electric locomotive, I shall now set forth specifically the structural details of a driving motor which embodies the preferred form of construction.

Reference may now be had to Figs. 3 and 4, in which the corresponding parts of the apparatus bear like reference numerals to those employed in connection with the diagrammatic illustration of the motor employed in Fig. 2.

The stationary field magnet structure 8 of the motor 4 comprises a cylindrical supporting yoke 30, a magnetizable laminated core 31, exciting field windings 9, a plurality of compensating windings 32, a plurality of end members or brackets 33 and a pair of bearing housings 34.

The supporting yoke 30 is located between the end brackets 33 and is provided with ventilating openings 36 and with inwardly projecting lugs 37 between which the laminated core structure 31 is positioned, said structure being assembled in the usual manner between a pair of end plates 38. The bearing housings 34 are of like and well-known construction and are removably secured to the edge of the end brackets 33 and are provided with bearing brasses 39 which are interposed between the inner bearing portions 40 thereof and the rotatable shaft 16.

The magnetizable core 31 is provided, in the usual way, with main exciting windings 9 and also compensating windings 32 which are disposed in the face of the core 31 adjacent to the air gap.

The armature 10 embodies a magnetizable laminated core structure 13 which is assembled between two annular supporting members 43 which respectively are adapted to support the commutator cylinders 11 and 12. The annular members 43 are mounted upon a pair of bearing members or spiders 45, the inner portions 46 of which surround the shaft 16 and are separated therefrom only by suitable bearing brasses 47 which are provided for the purpose of permitting relative movements between the shaft 16 and the armature 10.

The spiders 45 are respectively provided with outwardly projecting rings 48 upon which collector rings 20 are mounted. The rings 20 are electrically connected to the magnetizing windings 17 that are disposed in slots in the inner periphery 13$^a$ of the magnetizable core 13. The main armature coils 14 are positioned in slots in the outer peripheral portion 13ᵇ of the core 13 and are suitably electrically connected to the commutator cylinders 11 and 12. In order to compensate, in some degree, for the reduction of magnetic material in the inner portion 13ᵃ of the core 13 by reason of the smaller diameters, the width of the core 13 is increased by additional end laminations 51.

The auxiliary rotor 15 which is disposed within the armature 10 comprises a spider 54 which is fixed to the shaft 16 and which supports a laminated magnetizable core structure 55 in which a squirrel-cage winding 56 is embedded.

By reason of the peculiar arrangement and location of parts shown and described, a particularly compact and symmetrical mechanical design is obtained.

I have shown and described my invention, for illustrative purposes, as embodying more or less specific structural details, circuit connections and arrangement and location of parts, but it is to be understood that my invention, in its broadest aspect, is not to be so restricted, inasmuch as many modifications therein may be effected without departing from the spirit and scope of my invention, and, which will provide, to a greater or less extent, the advantages and benefits of my invention. I desire, therefore, that only such limitations shall be imposed as are indicated in the appended claims.

I claim as my invention:

1. In a dynamo-electric machine, the combination with a stationary magnetizable field structure, and a rotatable armature coöperating therewith and embodying a magnetizable core, a plurality of commutator cylinders and windings connected thereto, of an auxiliary rotor disposed within said core and a magnetizing winding associated with said core and adapted to effect the electro-magnetic locking of said rotor to said core.

2. The combination with a single-phase commutator dynamo-electric machine comprising a stationary field magnetic structure and a double commutator armature, of an auxiliary rotor disposed within said armature and means for electro-magnetically establishing a yielding driving connection between said armature and said auxiliary rotor.

3. The combination with a single-phase commutator dynamo-electric machine comprising a stationary field-magnet structure and a double-commutator armature, of squirrel-cage rotor disposed within said double-commutator armature and a magnetizing winding associated with said armature for effecting a yielding electro-magnetic driving connection between said armature and said rotor.

4. The combination with a single phase commutator motor comprising a stationary field-magnet structure and a relatively rotatable armature embodying a magnetizable core, a pair of commutator cylinders severally disposed at respective ends of said armature and windings associated with said core and connected to said cylinders, of a relatively rotatable squirrel-cage rotor disposed within said armature, and a magnetizing winding associated with said armature core for locking said core and said rotor together.

5. A dynamo-electric machine comprising a stationary magnetizable field structure, a relatively rotatable armature, a shaft upon which said armature is rotatably mounted, a dynamo-electric clutch disposed within said armature and comprising a squirrel-cage rotor secured to said shaft, and a magnetizing winding associated with said armature for locking said armature to said shaft.

In testimony whereof, I have hereunto subscribed my name this 12th day of March, 1915.

FRIEDRICH W. MEYER.

Witnesses:
D. C. DAVIS,
B. B. HINES.